United States Patent [19]
Cargnelutti

[11] Patent Number: 5,500,165
[45] Date of Patent: Mar. 19, 1996

[54] PROCESS FOR MANUFACTURING A FLUE MADE OF FIBER-REINFORCED PLASTIC, PARTICULARLY OF A STACK FOR DISCHARGING CHEMICALLY AGGRESSIVE FUMES

[75] Inventor: Mario Cargnelutti, Gemona del Friuli, Italy

[73] Assignee: Gruppo Sarplast S.p.A., Prioro Gargallo, Italy

[21] Appl. No.: 71,287

[22] Filed: Jun. 2, 1993

[51] Int. Cl.⁶ .............. B28B 7/22; E04B 1/16; F27D 1/16
[52] U.S. Cl. .............. 264/32; 264/30; 264/34; 264/255
[58] Field of Search .............. 264/30–36, 255, 264/308

[56] References Cited

U.S. PATENT DOCUMENTS

| | | | |
|---|---|---|---|
| 812,619 | 2/1906 | Timm | 264/32 X |
| 992,782 | 5/1911 | Lambie | 264/32 |
| 2,808,097 | 10/1957 | Martin | 156/425 X |
| 3,006,054 | 10/1961 | Dennis | 264/32 |
| 3,203,845 | 8/1965 | Short | 156/175 |
| 3,281,308 | 10/1966 | D'Asto | 264/30 |
| 3,352,072 | 11/1967 | Bole | 264/30 X |
| 3,492,383 | 1/1970 | Heimgartner | 364/30 |
| 3,672,649 | 6/1972 | Allen | 264/30 |
| 4,075,300 | 2/1978 | Keller | 264/32 |
| 4,190,993 | 3/1980 | Pohlman et al. | 264/32 X |
| 4,228,114 | 10/1980 | Alsen et al. | 264/34 X |
| 4,860,422 | 8/1989 | Marino | 264/30 X |

*Primary Examiner*—Karen Aftergut
*Attorney, Agent, or Firm*—Herbert Dubno

[57] ABSTRACT

A process for manufacturing a flue made of fiber-reinforced plastic (FRP), particularly of a stack for discharging chemically aggressive fumes, consists of manufacturing the FRP flue directly inside the stack. The apparatus for performing this process includes a rotating carousel which supports a first work station, a second work station and at least a third work station to progressively and constantly deposit on a stationary mold at least one first layer of chemically-resistant material and at least one layer of mechanically-resistant material in order to form, without discontinuities, a central portion of the flue of the stack.

7 Claims, 4 Drawing Sheets

5,500,165

PROCESS FOR MANUFACTURING A FLUE MADE OF FIBER-REINFORCED PLASTIC, PARTICULARLY OF A STACK FOR DISCHARGING CHEMICALLY AGGRESSIVE FUMES

FIELD OF THE INVENTION

The present invention relates to a process for manufacturing a flue made of fiber-reinforced plastic (FRP). More particularly, the invention relates to a process and apparatus for making a stack for discharging chemically aggressive fumes.

BACKGROUND OF THE INVENTION

As is known, stacks are currently used to discharge into the atmosphere the aggressive fumes for example of thermal power stations, of waste incineration plants, of chemical plants in general, of centralized heating stations and the like.

Each stack normally has, inside it, one or more flues which are made of metallic material, for example steel, which is covered with appropriate chemically resistant materials to ensure adequate resistance to the chemically aggressive fumes which are expelled from the flue.

Currently, steel flues are defined by a plurality of tube elements which are modular and are assembled and which are manufactured in a factory which, due to logistic reasons, is usually distant from the site of the stack.

The steel tubes are then transported from the factory to the base of the stack to be inserted therein.

Subsequently, inside or outside the stack, they are turned through 90 degrees in order to be associated, one on top of the other, by flanging, welding, spigot joints etc., so as to form the flue.

The above mentioned method for manufacturing a steel flue has several problems.

For example, steel is a material which, as is known, is easily corrodible, especially in environments with humid fumes which contain sulfuric acid, such as for example the flues of stacks.

Steel is furthermore very heavy and thus difficult to handle inside a small space such as a stack, where, as mentioned, each tube must be rotated through 90 degrees.

In addition, the transport of the various tubes which will compose the flue from the factory to the stack, apart from causing additional costs, may cause damage to the inner linings of the tubes due to the impacts which unavoidably occur during their transport, loading and unloading.

Finally, the fact should also be stressed that the coupling between the various tubes is performed by specialized personnel that must work at different heights from the ground, inside the tube to be joined, with a high level of danger as to personal injury.

In order to at least partially obviate the above problems, and most of all in order to ensure considerable resistance to chemical corrosion of the flue by the fumes and also contain the weight of said flue, instead of using metallic materials, such as steel, flues are manufactured by connecting a plurality of tube elements made of fiber-reinforced plastic or FRP.

Like steel tubes, FRP tubes are also manufactured in factories which are distant from the stack and furthermore, since they are much more delicate than steel tubes, they are more severely affected by impacts caused during their transfer from the factory to the inside of the stack.

After the FRP tubes have been carried to the base of the stack, they must sometimes be inserted horizontally inside said stack, like steel tubes, and are then rotated inside it through 90 degrees in order to be arranged vertically and be joined one above the other.

In the case of FRP tubes, there is also, with respect to steel tubes, a severe problem due to the chemical-physical characteristics of this material.

The coupling of the various FRP tubes in order to produce the flue requires the personnel to work, as with steel tubes, directly inside the flue and at different heights from the ground.

Considering that FRP is a highly flammable material, the coupling of one tube to another to form the flue entails great danger due to possible fires and/or to the possible production of toxic gases which may be generated during this operation.

If one furthermore adds to this the fact that a flue has a considerable draught, it is understood that the danger for the personnel working at its manufacture is even greater than with steel tubes.

OBJECTS OF THE INVENTION

It is the object of the present invention, therefore, to overcome these drawbacks of the known art.

An important object of the present invention is to provide a process and an apparatus for manufacturing a flue made of fiber-reinforced plastic (FRP), particularly of a stack for the discharge of chemically aggressive fumes, which allows reduction of the transfer of said FRP tubes from the factory to the stack.

Another important object of the present invention is to provide a process and an apparatus for manufacturing an FRP flue, particularly of a stack, which eliminate the need to make joints between the various tubes which compose the flue and accordingly all the dangers for the working personnel which must currently perform said operations.

Still another object of the present invention is to provide a process and an apparatus for producing an FRP flue, particularly of a stack, which are highly economical since the time for the manufacture of said flue is reduced enormously.

SUMMARY OF THE INVENTION

These objects mentioned are substantially achieved by a process for manufacturing an FRP flue, particularly of a stack for discharging chemically aggressive fumes, wherein at least one FRP flue is manufactured directly inside said stack.

The execution of said process is obtained by means of an apparatus for manufacturing an FRP flue, particularly of a stack for discharging chemically aggressive fumes, which comprises a rotating carousel which supports a first work station, a second work station and at least a third working station for the progressive and constant deposition, on a stationary mold, of at least one first layer of chemically resistant material and of at least one layer of mechanically resistant material so as to form, without discontinuities, a central portion of said at least one flue of said stack.

BRIEF DESCRIPTION OF THE DRAWING

The above and other objects, features, and advantages will become more readily apparent from the following description, reference being made to the accompanying drawing in which.

With reference to the above described figures, the process according to the invention consists in manufacturing, according to the size of the stack, one or more FRP flues directly inside said stack.

Advantageously, the FRP flue is built vertically, with its axis substantially parallel to the axis of the stack, and at least its central portion, comprised between the two ends of the flue, is manufactured as a single unit without discontinuities along its longitudinal extension, so as to completely eliminate joints between the various tubes which composed the flues of the known art.

More precisely, while the upper end and the lower end of the FRP flue are manufactured with conventional methods, at least the central portion of said flue is manufactured by progressively depositing a number N of layers of material around a stationary mold which is accommodated inside the base of the stack.

Figure 2:
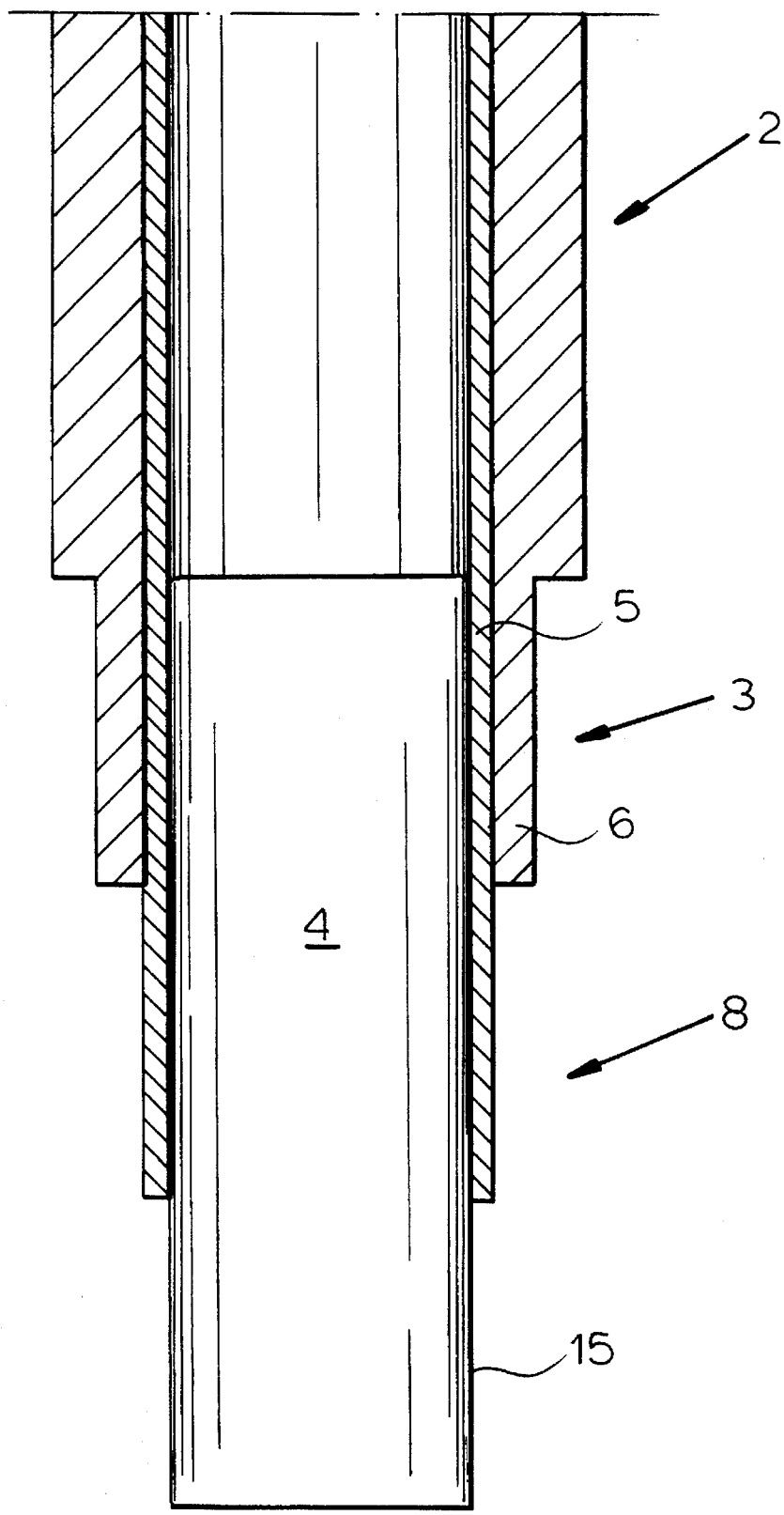
FIG. 2 is a diagrammatic sectional view of the mold at the beginning of the process according to the present invention.

Initially, an upper end portion of the FRP flue is prepared on the stationary mold. This end portion is defined by at least three annular regions 2, 3 and 8, the first of which, designated by 2, is already completed with N layers of material of preset thickness and is arranged, as shown in FIG. 2, outside and above the stationary mold 4.

Below the first annular region 2 there is at least one second annular region 3 which has a layer of chemically resistant material 5 and at least one first layer of mechanically resistant material 6 and is positioned on the upper part of the mold 4 below the first annular region.

The third annular region 8 is defined only by the layer of chemically-resistant material 5.

In this manner, the mold has, below the third annular region 8, a free surface 15 whose extent is substantially equal to the extent of the second and third annular regions which lie above it.

At this point it is possible to start the normal operation of the process for the manufacture of the central part of the flue.

In particular, a layer 16 of chemically resistant material, equal in thickness to the layer 5, is distributed on the free surface 15 of the mold 4, and a second layer 7 of mechanically resistant material, having such a thickness as to complete the wall of the flue in the second annular region, is simultaneously distributed on the second annular region 3.

Simultaneously with the forming of the chemically resistant layer and of the second mechanically resistant layer 7, a first layer 17 of mechanically resistant material is deposited in the third annular region 8 above the chemically resistant layer 5.

Figure 3:
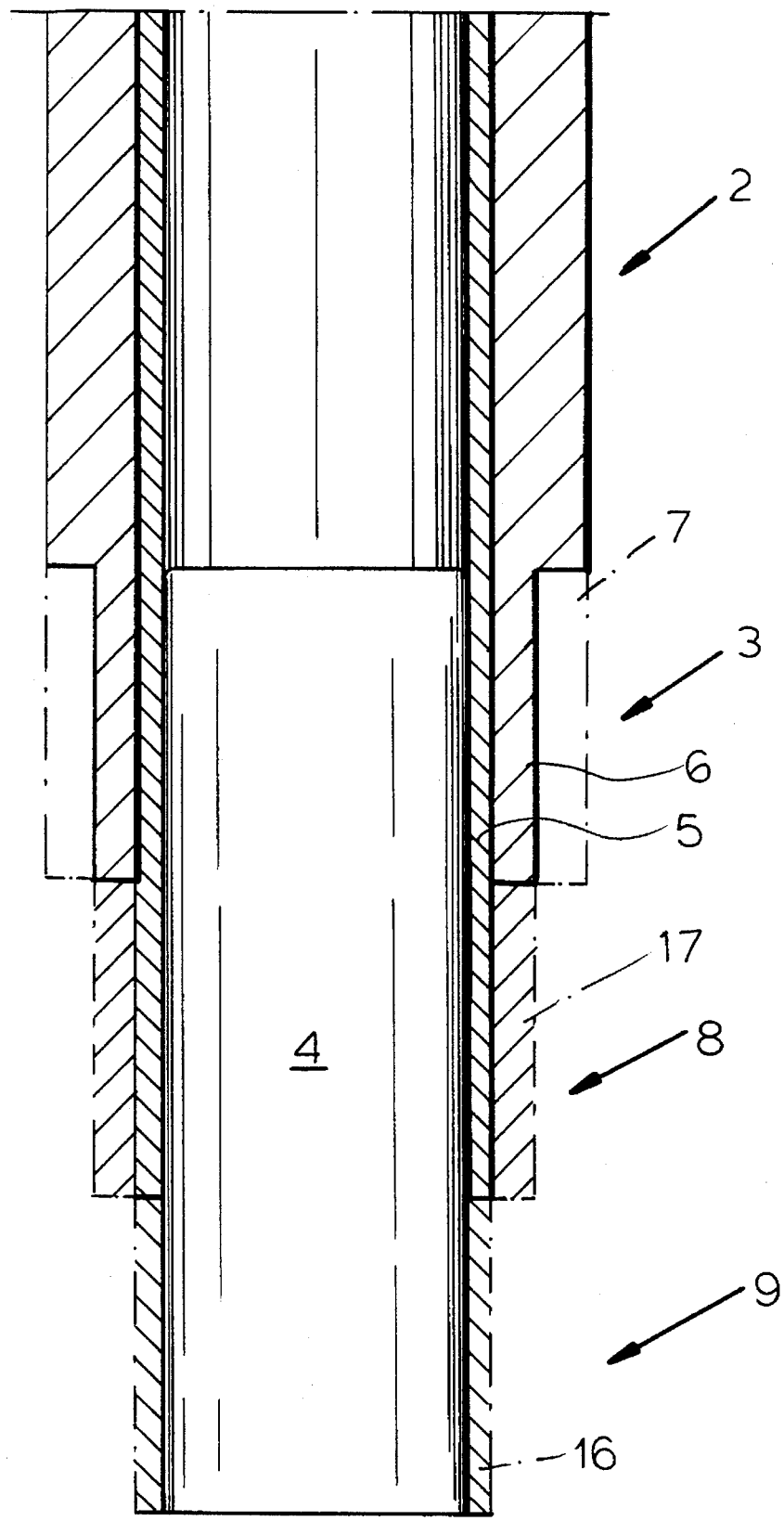
FIG. 3 is a diagrammatic sectional view of the stationary mold on which the various layers of material are deposited according to the steps of the process.

In this manner, in addition to the first region which is already finished, the wall which defines the flue is completed in the second annular region 3 as well (FIG. 3).

Figure 4:
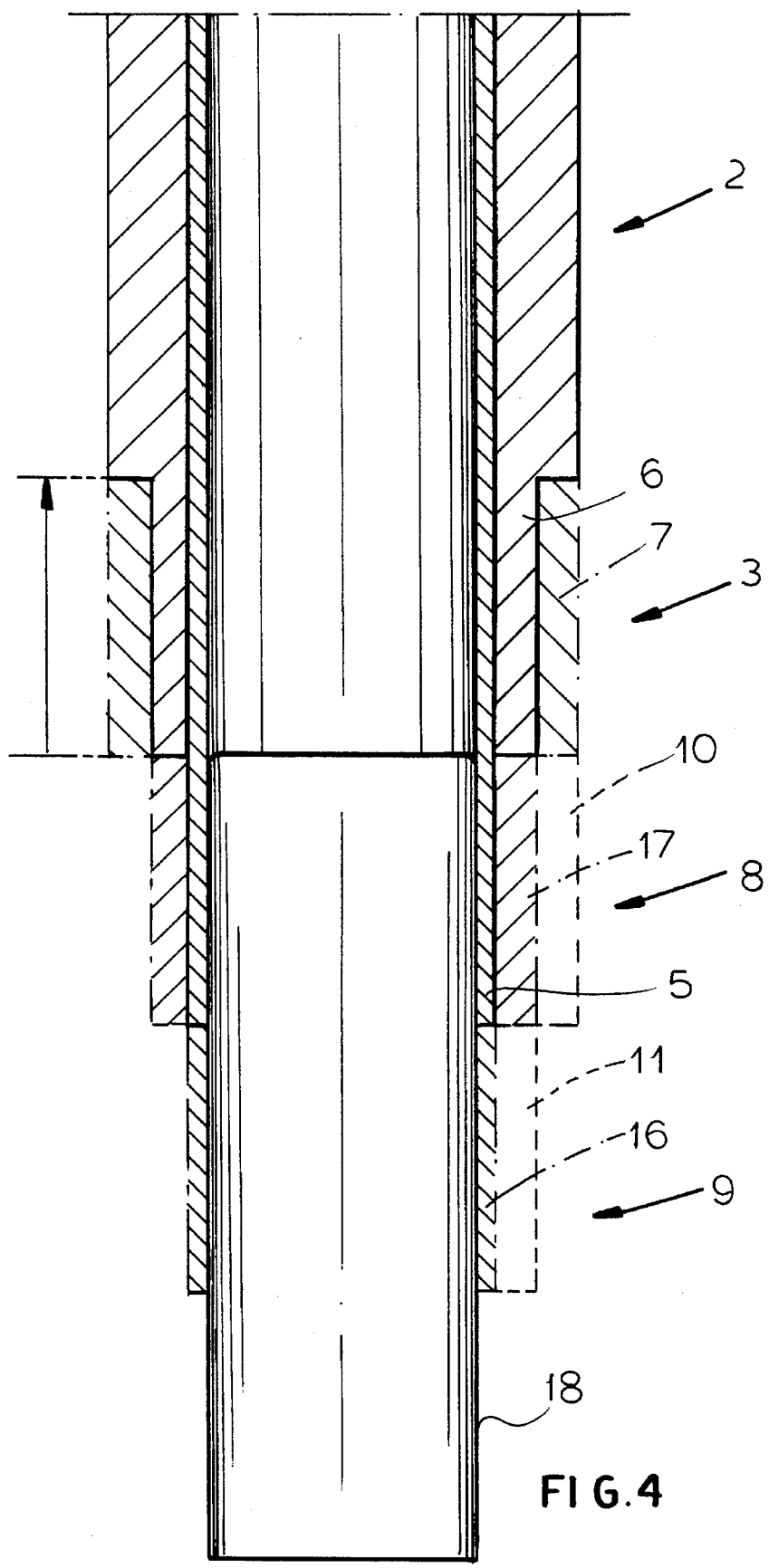
FIG. 4 is a view of the completion of a further portion of the flue, subsequent to the one shown in FIG. 3.

Subsequently, by virtue of appropriate means, after the first layer of chemically resistant material of the free portion 15 has been allowed to cure, the flue so far produced is raised by a preset amount (FIG. 4) which is equal to the height of the second annular region 3, so that the latter, by sliding out of the stationary mold, exactly occupies the position which was occupied by the first region in FIG. 3.

By sliding out the upper end of the flue by the preset amount, a new free surface 18 is defined on the mold 4. The new free surface is to be covered with a layer of chemically resistant material 5 simultaneously with the covering of the third annular region 8 with a second layer 10 of mechanically resistant material and of a fourth annular region 9 with a first layer 11 of mechanically resistant material.

By continuing with this method, it is clearly understood that it is possible to manufacture the flue continuously directly inside the stack and thus avoid the execution of any joints between the various tubes which composed known flues.

Finally, it should be specified that the mechanically resistant material of the first layer and of the second layer is deposited alternatively, on the chemically resistant material, circumferentially and axially with respect to said mold.

Furthermore, the thickness of the first layer of mechanically resistant material is equal to the thickness of the second layer of said material and the sum of the two, together with the thickness of the chemically resistant layer, produces a thickness which is equal to the N layers which define the completed wall of the flue.

Figure 1:
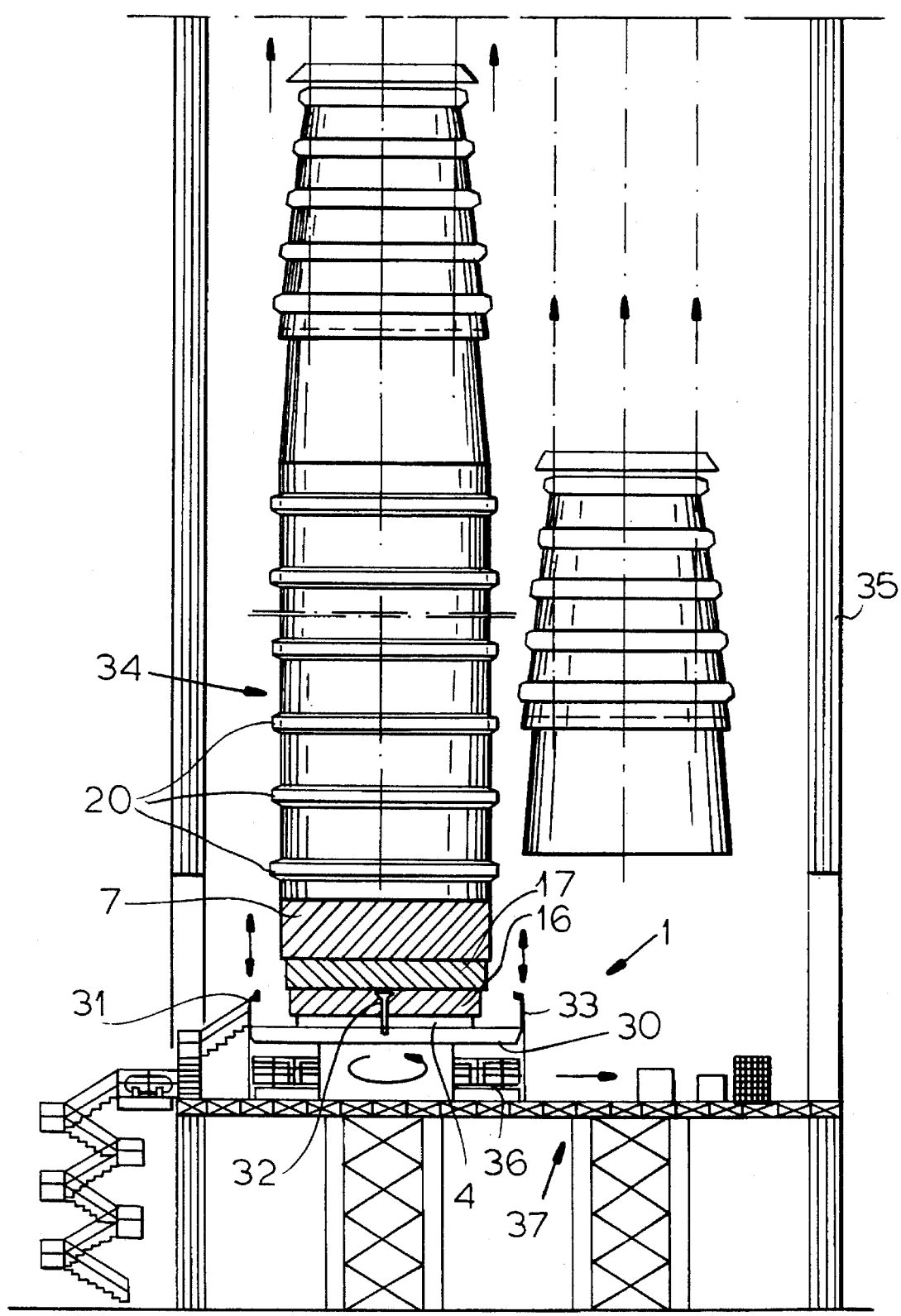
FIG. 1 is a transverse sectional lateral elevation view of a stack on whose base there are the rotating carousel and the stationary mold on which the body of the flue according to the invention is formed progressively and without discontinuities.

It should be furthermore specified that, during the drying of the chemically resistant layer (which is deposited on the free surface of the mold core in each instance) and simultaneously with the deposition of the first layer and of the second layer of the mechanically resistant material, a thermally insulating covering is placed on the finished surface of the flue, which is defined by the N layers, or a circumferential stiffening ribbing 20 is produced, as shown in FIG. 1.

The above described process is executed by means of an apparatus which is also the subject of the present invention patent.

The apparatus, generally designated by the reference numeral 1, comprises a rotating carousel 30 which supports a first work station, a second work station and at least a third work station, designated respectively by 31, 32 and 33, of a per se known type, suitable to progressively and constantly deposit, on a stationary mold 4, at least one first layer of chemically resistant material and at least one layer of mechanically resistant material in order to form, without discontinuities, a central portion 34 of at least one flue of the stack 35.

The first, second and third stations furthermore have means 36 for lifting them from the carousel 30 along the mold 4 in order to deposit said materials at different preset heights thereof.

In particular, during the forming of the flue, the first, second and third stations deposit, at least in an initial step, a layer of chemically resistant material 5 simultaneously with the deposition, on two different levels of the mold 4, of a first layer 7 and of a second layer 17 of mechanically resistant material.

Furthermore, at least the station suitable to deposit the layer of chemically resistant material, once said material has dried, is also suitable to deposit a thermally insulated material on the part of-the flue which has already been formed or, alternatively, said station is suitable to form the circumferential stiffening ribbing 20 on said flue.

In this manner manufacturing time is reduced greatly and in any case there are substantially no downtimes during the manufacture of the flue.

Finally, it should also be specified that the stationary mold 4 is accommodated above the rotating carousel 30 with a vertical axis which is substantially parallel to the axis of the stack.

Obviously, the rotating carousel 30 can have, according to the requirements, more than three work stations and can furthermore be transferred from one side or the stack to the other, for example by sliding on rails provided on the scaffolding 37 defined at the base of said stack.

In this manner, after completing a first flue, the apparatus can be assigned to the manufacture of a second flue or of a third one to be produced inside the stack.

The invention achieves the intended aim and objects and achieves numerous and important advantages.

A new process has in fact been devised which allows manufacture of a FRP flue directly inside a stack, so that at least the central portion of the flue is manufactured without discontinuities and continuously in a single unit, eliminating the onerous and dangerous joining welds between the plurality of tubes which were required in order to manufacture a flue according to the known art.

The invention thus conceived is susceptible to numerous modifications and variations, all of which are within the scope of the present inventive concept; all the details may furthermore be replaced with technically equivalent elements.

The materials employed, the shapes and the dimensions may be any according to the requirements.

I claim:

1. A process for manufacturing a flue made of fiber-reinforced plastic in place within a stack for discharging chemically aggressive fumes, said process comprising the steps of:

(a) forming within said stack an inner layer of said flue of fiber-reinforced material spaced from an inner wall of said stack;

(b) raising said inner layer of fiber-reinforced material and applying an outer layer of fiber-reinforced material over said inner layer and spaced from said inner wall of said stack; and (c) repeating steps (a) and (b) until a complete fiber-reinforced plastic flue is constructed within said stack which is self supporting and spaced from said inner wall of said stack, said flue comprising, an upper end portion which forms a first annular region located above a stationary mold on which said layers are formed and cured and which upper end portion consists of a plurality of layers of material of preset thickness, and wherein below said first annular region of said flue on an upper part of said mold there is at least one second annular region of said flue on said mold having a layer of chemically-resistant material against said mold and a layer of mechanically-resistant material on said layer of chemically-resistant material, below said second annular region there is a third annular region of said flue of substantially the same height as said second annular region and in which said layer of chemically-resistant material lies against said mold, and below said third annular region there is a free surface of said mold of a height substantially equal to the heights of said second and third annular regions of said flue, said process further comprising the steps of:

applying a layer of chemically-resistant material on said free surface of said mold simultaneously with application of a layer of mechanically-resistant material on said layer of chemically-resistant material in said third annular region and application of at least one further layer of material to said layer of mechanically-resistant material of said second annular region;

permitting said layers to cure for a preset time;

sliding said flue upwardly to expose a new free surface of said mold and form new third, second and first annular regions of said flue above said free surface of said mold; and repeating said application of said layer of chemically resistant material to said free surface, said layer of mechanically-resistant material to said layer of chemically-resistant material of said third annular region and said at least one further layer of material to said layer of mechanically-resistant material of said second annular region until a full height of said flue is built up within said stack.

2. The process defined in claim 1 wherein said mechanically-resistant material is applied circumferentially and axially on said chemically-resistant material.

3. The process defined in claim 1 wherein said mechanically-resistant material is deposited in a plurality of layers of equal thickness.

4. The process defined in claim 1 wherein said thickness of said plurality of layers of said first annular region is equal to a sum of thicknesses of said layer of chemically-resistant material and two layers of said mechanically-resistant material.

5. The process defined in claim 1 wherein a thermally insulating layer is deposited on said upper end portion of said flue in said first annular region.

6. The process according to claim 1 wherein said fiber-reinforced plastic flue is manufactured vertically with its axis substantially parallel to an axis of said stack.

7. The process according to claim 1 wherein at least a central portion, comprised between two ends of said flue, is manufactured inside said stack as a single unit which has no discontinuities along a length thereof.

* * * * *